United States Patent
Kim et al.

(10) Patent No.: US 7,881,613 B2
(45) Date of Patent: Feb. 1, 2011

(54) WAVELENGTH TRACKING APPARATUS AND METHOD IN WDM-PON SYSTEM

(75) Inventors: Byoung Whi Kim, Daejeon (KR); Woo Ram Lee, Daejeon (KR); Yun Chur Chung, Daejeon (KR); Eui Seung Son, Seongnam (KR); Jang Won Chae, Anyang (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1063 days.

(21) Appl. No.: 11/635,701

(22) Filed: Dec. 7, 2006

(65) Prior Publication Data

US 2007/0154216 A1 Jul. 5, 2007

(30) Foreign Application Priority Data

Dec. 12, 2005 (KR) ............ 10-2005-0121985

(51) Int. Cl.
H04B 10/08 (2006.01)
(52) U.S. Cl. .............. 398/71; 398/70; 398/38; 398/9; 398/94
(58) Field of Classification Search .......... 398/58, 398/66–68, 70–72, 9, 93, 94, 38, 42, 41, 398/34, 156
See application file for complete search history.

(56) References Cited

U.S. PATENT DOCUMENTS

| | | | |
|---|---|---|---|
| 6,301,031 B2 * | 10/2001 | Li ................... | 398/9 |
| 6,304,350 B1 * | 10/2001 | Doerr et al. ............ | 398/9 |
| 7,469,102 B2 * | 12/2008 | Lee et al. .............. | 398/79 |
| 7,593,647 B2 * | 9/2009 | Lee et al. .............. | 398/195 |
| 2005/0078356 A1 * | 4/2005 | Kwon et al. ............ | 359/337 |
| 2005/0129402 A1 * | 6/2005 | Kim et al. .............. | 398/79 |
| 2006/0093359 A1 * | 5/2006 | Lee et al. .............. | 398/70 |

FOREIGN PATENT DOCUMENTS

| | | |
|---|---|---|
| KR | 10-2001-0019027 | 3/2001 |
| KR | 1020050060135 | 6/2005 |
| KR | 10-2005-0072280 | 7/2005 |
| KR | 1020050072280 | 7/2005 |

OTHER PUBLICATIONS

Jung, D.K., "Wavelength-Tracking Technique for Spectrum-Sliced WDM Passive Optical Network." Mar. 2000. *IEEE Photonics Technology Letters*, vol. 12, No. 3, pp. 338-340.

* cited by examiner

*Primary Examiner*—Ken N Vanderpuye
*Assistant Examiner*—Hibret A Woldekidan
(74) *Attorney, Agent, or Firm*—Ladas & Parry LLP

(57) ABSTRACT

Provided are an apparatus and method for tracking a wavelength in a passive optical subscriber network in which a central base station and at least one subscriber terminal are connected via a remote node. The apparatus includes a first wavelength aligning unit multiplexing and aligning wavelengths of optical signals from a plurality of single-mode optical sources of the central base station; a second wavelength aligning unit multiplexing and aligning wavelengths of optical signals transmitted to the remote node from a plurality of single-mode optical sources of the subscriber terminal; and a third wavelength aligning unit demultiplexing and aligning wavelengths of optical signals from the second wavelength aligning unit, the third wavelength aligning unit being included in the central base station. Accordingly, when the wavelengths of passbands of a multiplexer/demultiplexer (MUX/DEMUX) of a remote station change due to a change in the ambient temperature, wavelength tracking is performed by making aligned the wavelengths of optical sources of a central base station, a multiplexer/demultiplexer, and subscriber terminals, thereby minimizing optical channel loss and enabling reliable management of WDM-PON.

4 Claims, 10 Drawing Sheets

WAVELENGTH TRACKING APPARATUS AND METHOD IN WDM-PON SYSTEM

CROSS-REFERENCE TO RELATED PATENT APPLICATIONS

This application claims the priority of Korean Patent Application No. 10-2005-121985, filed on Dec. 12, 2005, in the Korean Intellectual Property Office, the disclosure of which is incorporated herein in its entirety by reference.

BACKGROUND OF THE INVENTION

1. Field of the Invention

The present invention relates to a wavelength tracking apparatus and method in a wavelength-division multiplexed (WDM)-passive optical network (PON), and more particularly, to a reliable WDM-PON system by aligning wavelengths of an optical source in the central office, a pass band of multiplexer/demultiplexer in the central office, and an optical source in the subscriber terminal, with respect to a pass band of the multiplexer/demultiplexer in the remote node, which varies according to ambient temperature.

2. Description of the Related Art

A digital subscriber line (DSL) technique that uses a unshielded twisted pair (UTP) and a cable modem termination system (CMTS) technique that uses a hybrid fiber coaxial (HFC), which have been currently used, are not expected to guarantee a bandwidth and service quality enough to provide subscribers with a convergence service of voice, data, and broadcasting which will be widely popularized in a few years. To solve this problem, a great deal of research has been conducted all over the world to develop a fiber-to-the home (FTTH) technique that connects the subscriber's home to the network via an optical fiber.

In a wavelength-division multiplexed (WDM)-passive optical network (PON), since communications are established between a central office and each subscriber by using a wavelength allocated to the subscriber, it is possible to provide a variety of independent communication services to each subscriber while guaranteeing quality of service and security. Also, unlike time division multiplexing (TDM), the WDM-PON assigns each wavelength to an individual subscriber who may use an optical source with low output power and a receiver with a narrow bandwidth.

However, the WDM-PON employs optical sources corresponding to subscribers, each optical source having a unique wavelength, thus increasing installation costs, and is substantially difficult to be competitive in cost over the TDM based passive optical network accordingly. Thus, development of a low-cost optical source for the WDM-PON is critically important. Also, in terms of equipment management, preparing a stock of optical sources having different wavelengths for respective subscribers against mechanical and functional troubles may be too heavy a burden for a service provider. Therefore, it is very important to design a WDM-PON that can provide subscribers with the ONT (optical Network Terminal) of one kind with wavelength-independent optical source.

For reliable management of the WDM-PON, it is important to monitor wavelengths of optical sources against aging of the componets or temperature changes, and optical fiber cut, and to align wavelengths of the multiplexer/demultiplexer whose pass band change according to ambient temperature.

In particular, it is very important to align wavelengths of optical sources and the multiplexer/demultiplexer in the central office, and an optical source of a subscriber terminal (ONT) with respect to a pass band of the multiplexer/demultiplexer in the remote node (RN) whose pass bands vary on ambient temperature changes.

For easy repair and management of the WDM-PON, electric current is not supplied to a remote node. However, in this case, the temperature of the optical multiplexer/demultiplexer in the remote node may change from −40° C. to 80° C., and particularly, to a maximum of 120° C., according to ambient temperature.

Accordingly, misalignment of wavelengths of the WDM multiplexers/demultiplexers (WMD) of the central office (CO) and the remote node (RN), and wavelengths of the WDM multiplexer/demultiplexer (WMD) in the remote node and each of optical sources of ONTs, may cause not only optical loss in the optical channels but also performance degradation due to crosstalk occurring between optical channels.

To solve these problems, a wavelength tracking method has been introduced to equalize a wavelength of an optical source for downward transmission with a passband of WMD, which varies upon ambient temperature change.

Also, a method has been introduced to equalize a passband of WMD in the RN with that of WMD in the CO for a WDM-PON that uses a spectrum-sliced optical source. However, these methods do not disclose alignment of the wavelength of an optical source, a pass band of WMD in CO, a pass band of WMD in RN, and an optical source in ONT. These methods are not applicable to a WDM-PON that uses a general single-mode optical source.

SUMMARY OF THE INVENTION

The present invention provides a system and method for aligning wavelengths of an optical source and an optical multiplexer/demultiplexer of a central base station, an optical multiplexer/demultiplexer of a remote node, and an optical source of a subscriber terminal together in a wavelength-division multiplexing (WDM)-passive optical network (PON) that uses a single-mode optical source.

According to an aspect of the present invention, there is provided an apparatus for tracking a wavelength in a passive optical subscriber network in which a central base station and at least one subscriber terminal are connected via a remote node, the apparatus comprising a first wavelength aligning unit multiplexing and aligning wavelengths of optical signals from a plurality of single-mode optical sources of the central base station; a second wavelength aligning unit multiplexing and aligning wavelengths of optical signals transmitted to the remote node from a plurality of single-mode optical sources of the subscriber terminal; and a third wavelength aligning unit being included in the central base station, and demultiplexing and aligning wavelengths of optical signals from the second wavelength aligning unit.

According to another aspect of the present invention, there is provided a method of tracking a wavelength in a passive optical subscriber network in which a central base station and at least one subscriber terminal are connected via a remote node, the method comprising a first wavelength aligning operation in which wavelengths of optical signals from a plurality of single-mode optical sources of the central base station are multiplexed and aligned; a second wavelength aligning operation in which the remote node multiplexes and aligns wavelengths of optical signals from a plurality of single-mode optical sources of the subscriber terminal; and a third wavelength aligning operation in which the central base station demultiplexes and aligns the optical signals being demultiplexed and aligned in the second wavelength aligning operation.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

Figure 1:
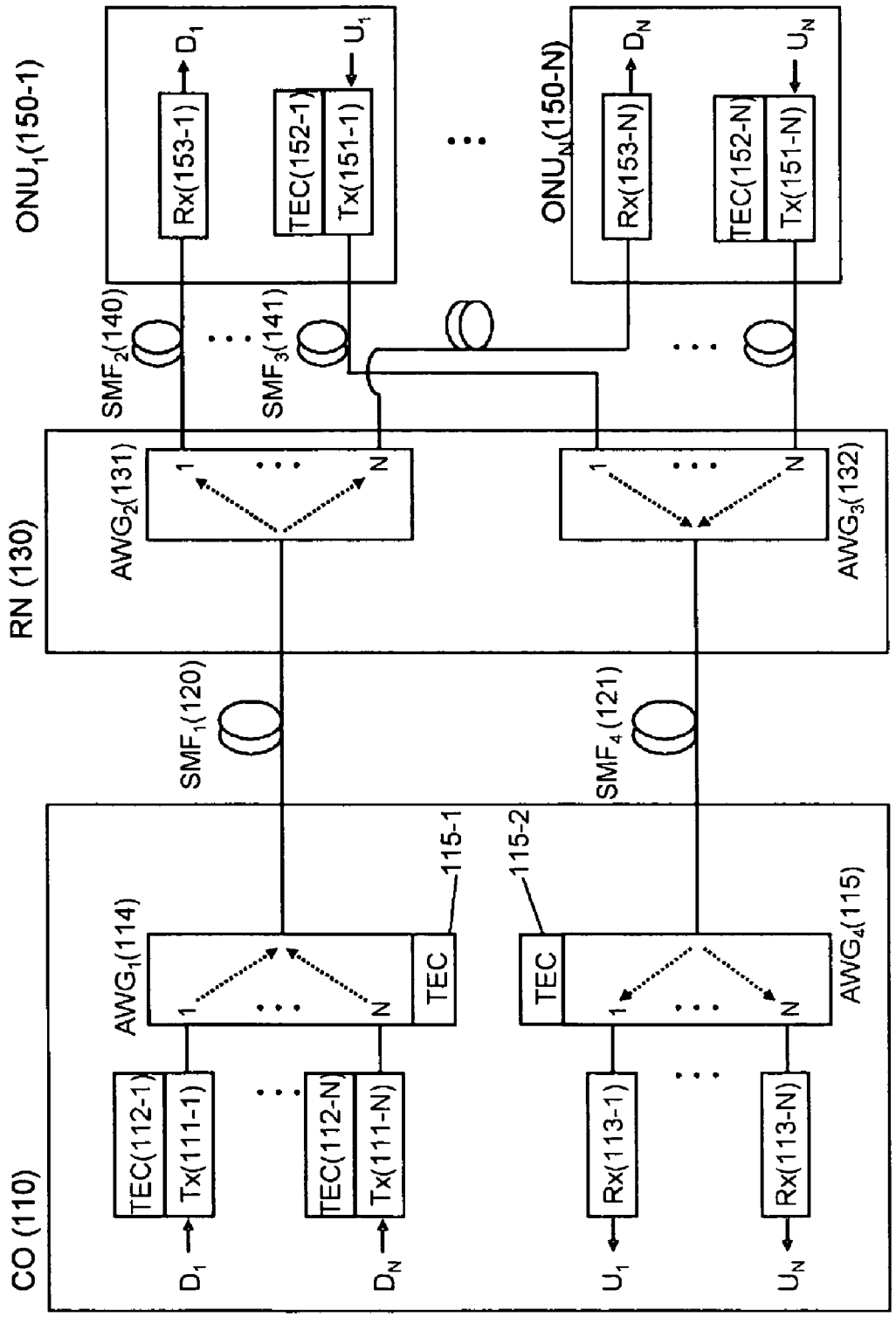
FIG. 1 is a block diagram of a wavelength-division multiplexing (WDM)-passive optical network (PON) system that uses a single-mode optical source.

Hereinafter, exemplary embodiments of the present invention will be described in detail with reference to the accompanying drawings. Throughout the drawings, whenever the same element reappears in a subsequent drawing, it is denoted by the same reference numeral.

FIG. 1 is a block diagram of a general wavelength-division multiplexed (WDM)-passive optical network (PON) system that uses a single-mode optical source. Referring to FIG. 1, the system includes a central base station 110, an optical fiber 120 for a downstream signal, an optical fiber 121 for an upstream signal, a remote node 130, an optical fiber 140 for a downstream signal, an optical fiber 141 for an upstream signal, and N subscriber terminals 150.

The central base station 110 includes an array of N individual or integrated single-mode optical sources 111 (a DFB-LD, etc.), an array of individual or integrated optical receivers 113, an optical multiplexer 114, and an optical demultiplexer 115.

The single-mode optical sources 111 output a unique wavelength for one subscriber terminal 150. Thus, N-optical sources build up N wavelengths, for the N subscriber terminals 150, i.e., downstream signals $D_i$ (i=1 to N). The array of the optical receivers 113 may be constructed with PIN-PDs or APDs, and receive upstream signals $U_i$ from the N subscriber terminal 150 (i=1 to N). The optical multiplexer 114 multiplexes signals from the N single-mode optical sources 111 and delivers the multiplexing result to the optical fiber 120.

N thermoelectric coolers 112 are respectively connected to the N single-mode optical sources 111 so as to control wavelengths of the N single-mode optical sources 111.

The remote node 130 also includes an optical multiplexer 131 and an optical demultiplexer 132. The optical demultiplexer 131 distributes the downstream signals $D_i$ to the N subscriber terminals 150 via the optical fiber 140 according to a wavelength.

Each of the N subscriber terminals 150 includes a single-mode optical source 151 and an optical receiver 153. Like in the central base station 110, N thermoelectric coolers 152 are respectively connected to the N single-mode optical sources 151 to control wavelengths of the N single-mode optical sources 151. The N optical receivers 153 respectively receive the downstream signals $D_i$, and the N single-mode optical sources 151 respectively modulate the received downstream signals $D_i$, into the upstream signals $U_i$ and transmit the upstream signals $U_i$ to the central base station 110.

The lights modulated into the upstream signals $U_i$ are multiplexed by the optical multiplexer 132 of the remote node 130 via the optical fiber 141, and the multiplexed lights are supplied to the central base station 110 via the optical fiber 121. The supplied multiplexed lights are demultiplexed via the optical demultiplexer 115 according to a wavelength, and supplied to the optical receivers 113.

The optical receiver 113 finally receives the upstream signal $U_N$. However, a change in a passband of the optical demultiplexer 131 and the optical demultiplexer 132 due to a change in the ambient temperature of the remote node 130 may cause not only loss in optical channels of the upstream and downstream signals but also performance degradation due to a crosstalk among the wavelength channels.

Figure 2:
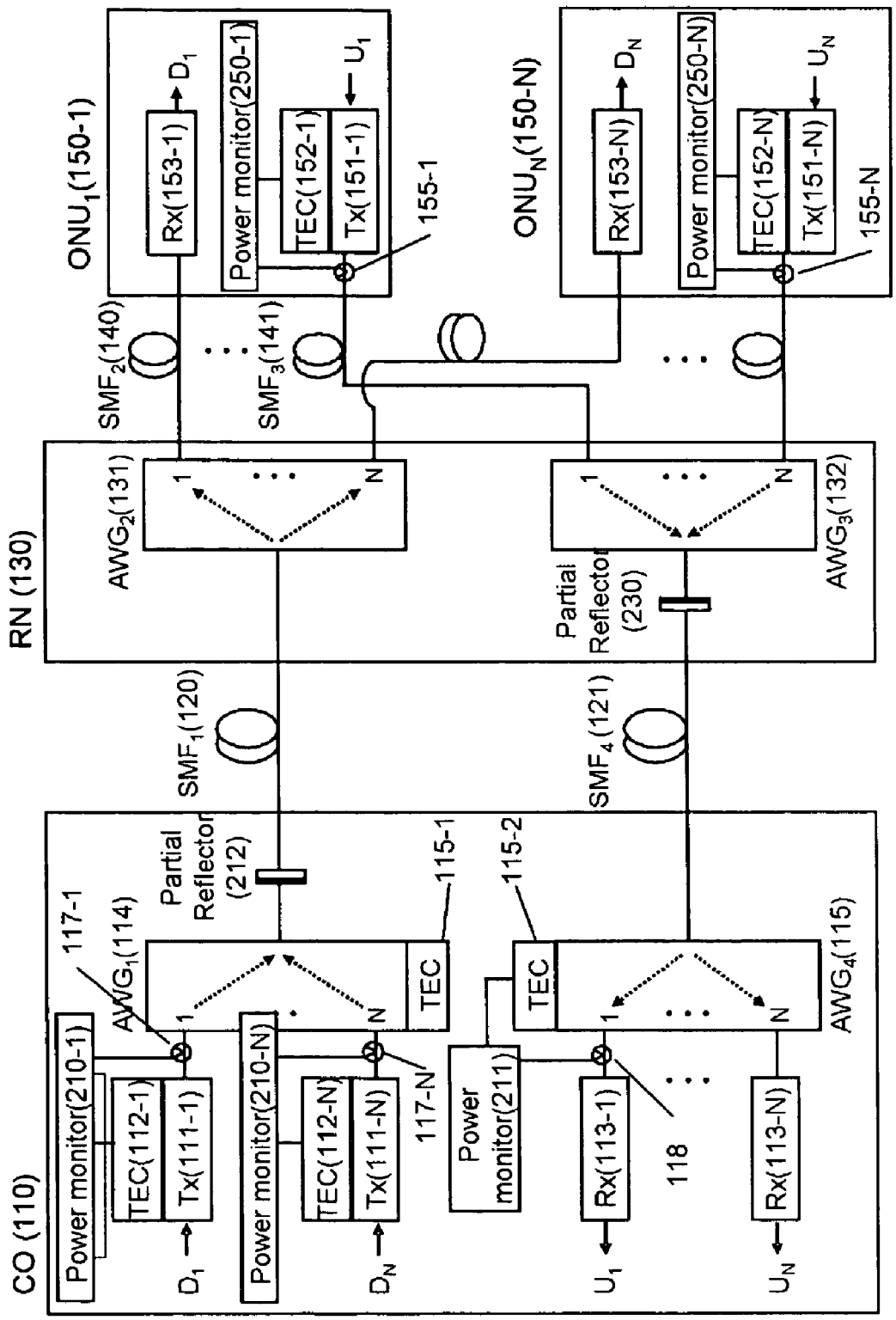
FIG. 2 is a block diagram of a wavelength tracking apparatus included in a WDM-PON system according to an embodiment of the present invention.

FIG. 2 is a block diagram of a wavelength tracking apparatus for use in a WDM-PON system according to an embodiment of the present invention. Referring to FIG. 2, in order to maintain the system performance even when a passband of an optical demultiplexer 131 and an optical multiplexer 132 of a remote node 130 of FIG. 1 change, power monitors 210, 211, and 250 and partial reflectors 212 and 230 according to an embodiment of the present invention are installed into a central base station 110, the remote node 130, and subscriber terminals 150.

The installed power monitors 210, 211, and 250 and partial reflectors 212 and 230 equalize a wavelength of an optical multiplexer 114 of the central base station 110 with those of optical sources 111 of the central base station 110, a wavelength of an optical multiplexer 132 of the remote node 130 with those of subscriber optical sources 151, and wavelengths of an optical multiplexer 114 and an optical demultiplexer 115 of the central base station 110 with those of the optical demultiplexer 131 and the optical multiplexer 132 of the remote node 130.

Thus, even if wavelengths of passbands of the optical multiplexer 131 and the optical demultiplexer 132 are changed due to a change in the temperature of the remote node 130, optical downstream signals from the central base station 110 are transmitted to the subscriber terminals 150 and optical upstream signals from the subscriber terminals 150 are transmitted to the central base station 110 without optical loss.

Aligning wavelengths of the optical multiplexer 114 and the optical sources 111 of the central base station 110, lights emitted from the optical sources 111 pass through the optical multiplexer 114, and some portion of the power of the lights are reflected from the partial reflector 212 and the other portion pass through the partial reflector 212 for transmission of the downstream signals.

The lights reflected from the partial reflector 212 pass through the optical multiplexer 114 again, and some portion of the reflected power of the lights are fed into the power monitors 210 via optical couplers 117, respectively.

Each of the power monitors 210 controls a thermoelectric cooler 112 connected to the corresponding optical source 111 to maximize the power of the received light. In particular, since the lights reflected from the partial reflector 212 pass through the optical multiplexer 114 twice, the lights are significantly affected by a change in a passband of the optical multiplexer 114, and thus can be efficiently used for wavelength tracking.

Aligning wavelengths of the optical multiplexer 132 of the remote node 130 with those of the optical sources 151, lights emitted from the optical sources 151 pass through the optical multiplexer 132 via the optical fiber 141, and some portion of the optica; power of the passing lights are reflected from the partial reflector 230 and the other portion of the power pass through the partial reflector 230 for transmission of upstream signals.

The reflected power of the lights pass through the optical multiplexer 132 and the optical fiber 141 and travel into the power monitors 250 via optical couplers 155, respectively. Then, each of the power monitors 250 controls the thermoelectric cooler 152 connected to the corresponding optical source 151 to maximize the power level of the received light.

Lastly, the output power of upstream signals received at the central base station 110 are used in order to align wavelengths of the optical multiplexer 114 and the optical demultiplexer 115 of the central base station 110 with those of the optical multiplexer 131 and the optical demultiplexer 132 of the remote node 130. Specifically, upstream signals from the subscriber terminals150 sequentially pass through the remote node 130, the optical fiber 121, and the demultiplexer 115 of the central base station 110, and are finally supplied to the optical receivers 113. Some of the upstream signals are supplied to the power monitor 211 via an optical coupler 118 before the optical receiver 113. The power monitor 211 maximizes the power level of the received light by controlling a thermoelectric cooler 115-2 of the demultiplexer 115.

Figure 3:
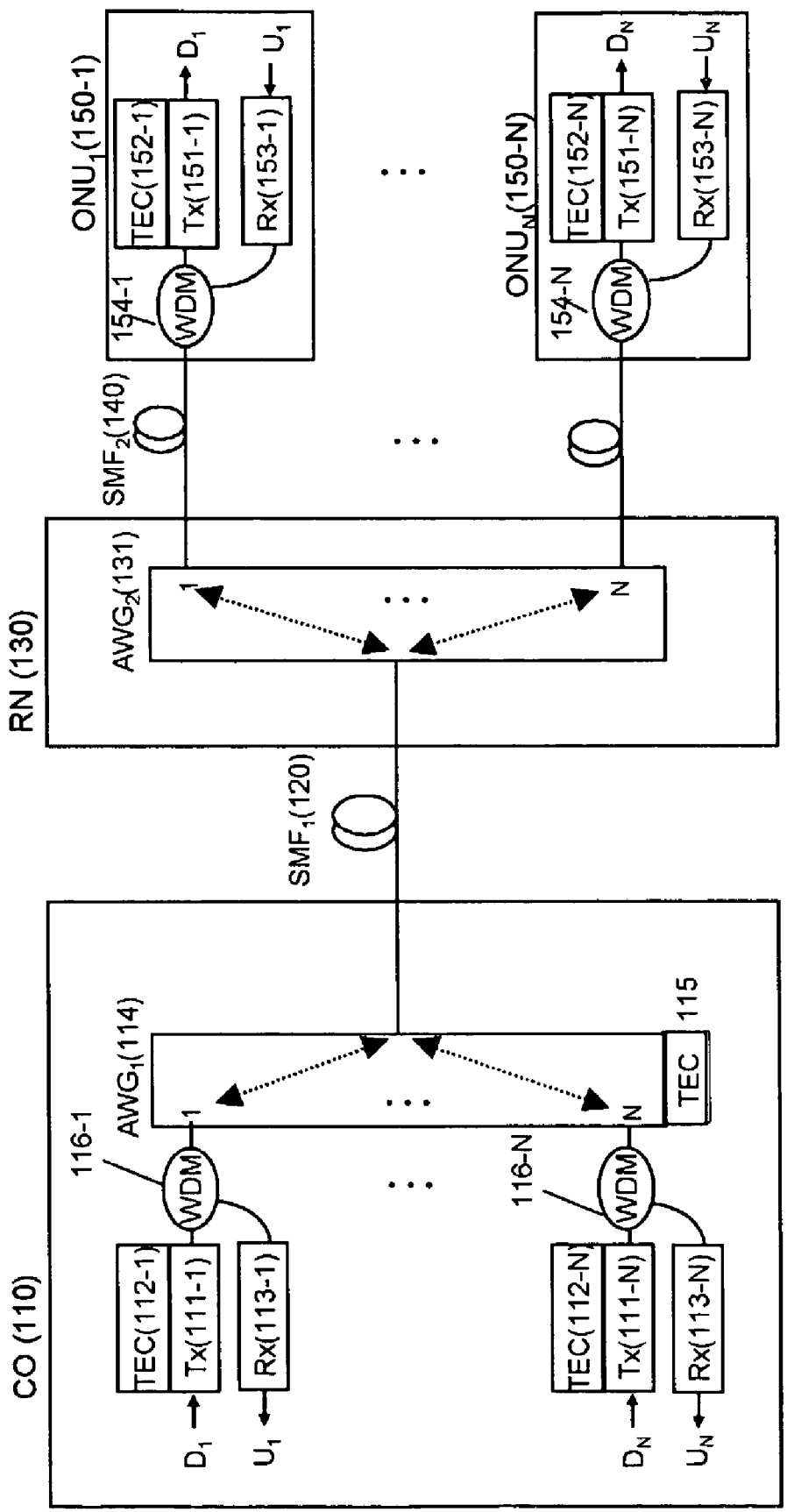
FIG. 3 is a block diagram of a bi-directional WDM-PON that uses a single optical fiber line.

FIG. 3 is a block diagram of a bi-directional WDM-PON system that uses a channel of an optical fiber. In the bidirectional WDM-POM system of FIG. 3, an optical fiber via which optical downstream signals and optical upstream signals are transmitted, is a single optical fiber 120 for economical efficiency.

Referring to FIG. 3, an array of N single-mode optical sources 111 modulate lights having N unique wavelengths into downstream signals $D_i$ (i=1 through N) to be transmitted to N subscriber terminals 150. An array of optical receivers 113 may be constructed with PIN-PDs or APDs, and receives upstream signals $U_i$ (i=1 to N) from subscriber terminals 150.

An optical demultiplexer/multiplexer 114 multiplexes the N single-mode optical sources 111 and outputs the multiplexed to the optical fiber 120.

Also, thermoelectric coolers 112 are respectively connected to the single-mode optical sources 111 to control wavelengths of the single-mode optical sources 111.

A remote node 130 includes an optical multiplexer/demultiplexer 131 that respectively distributes the downstream signals $D_i$ to the subscriber terminals 150 via the optical fiber 140 according to a wavelength. The optical demultiplexer/multiplexer 114 of the central base station 110 and the optical demultiplexer/multiplexer 131 of the remote node 130 are respectively constructed as single AWGs, each acting as an optical multiplexer or an optical demultiplexer according to the direction of an optical signal. In this type of use, the key of optical demultiplexer/multiplexer 114 or 131 is the passing wavelength periodicity of AWG.

Each of the subscriber terminals 150 includes single-mode optical source 151 and an optical receiver 153. Like in the central base station 110, a thermoelectric cooler 152 is connected to the single-mode optical source 151 to control a wavelength of the single-mode optical source 151. The optical receivers 153 respectively receive the downstream signals $D_i$, and the single-mode optical sources 151 respectively modulate the received optical signals $D_i$ into the upstream signals $U_i$ and transmit them to the central base station 110.

The upstream signals $U_i$ are multiplexed by the optical multiplexer 131 of the remote node 130 via an optical fiber 140, and the multiplexed lights are input to the central base station 110 via the optical fiber 120. The input multiplexed lights are demultiplexed by the optical demultiplexer 114 according to a wavelength and the demultiplexed lights are input to the optical receivers 113, respectively. Then, the nth optical receiver 113 finally receives the upstream signal $U_N$.

Compared to the WDM-PON system of FIG. 1, the bidirectional WDM-PON system of FIG. 3 that uses a single optical fiber further includes a WDM filter 116 in the central base station 110 and a WDM filter 154 in the subscriber terminals 150 in order to separate the optical upstream signals from the optical downstream signals.

Figure 4:
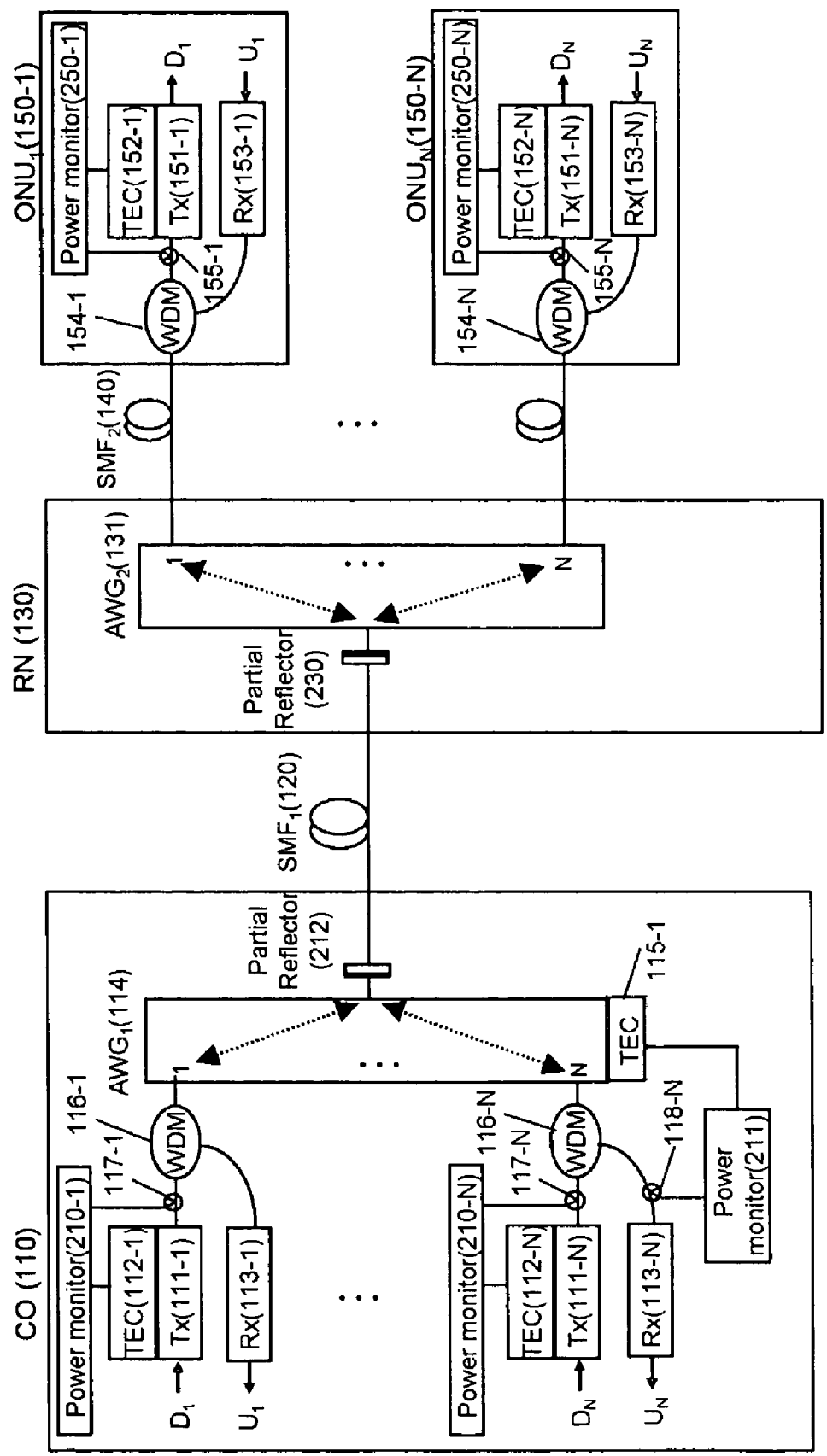
FIG. 4 is a block diagram of a WDM-PON illustrated in FIG. 3 which uses a wavelength tracking apparatus, according to an embodiment of the present invention.

FIG. 4 is a block diagram of a WDM-PON system, illustrated in FIG. 3, which uses a wavelength tracking apparatus, according to an embodiment of the present invention. Referring to FIG. 4, in order to maintain the system performance even when a passband of an optical multiplexer/demultiplexer 131 of a remote node 130 changes, power monitors 210, 211, and 250 and partial reflectors 212 and 230 according to an embodiment of the present invention are installed into a central base station 110, the remote node 130, and subscriber terminals 150.

The installed power monitors 210, 211, and 250 and partial reflectors 212 and 230 align wavelengths of an optical multiplexer/demultiplexer 114 of the central base station 110 with those of optical sources 111 of the central base station 110, wavelengths of the optical multiplexer/demultiplexer 131 of the remote node 130 with those of subscriber optical sources 151, and wavelengths of the optical multiplexer/demultiplexer 114 with those of the optical multiplexer/demultiplexer 131 of the remote node 130.

Thus, even if the wavelengths of passbands of the optical multiplexer/demultiplexer 131 of the remote node 130 are changed due to a change in the temperature of the remote node 130, optical downstream signals from the central base station 110 are transmitted to the subscriber terminals 150 and optical upstream signals from the subscriber terminals 150 are transmitted to the central base station 110 without optical loss.

Specifically, in order to equalize the wavelengths of the optical multiplexer/demultiplexer 114 and the optical sources 111 of the central base station 110, lights emitted from the optical sources 111 pass through the optical multiplexer/demultiplexer 114, and some portion of the optical power of the lights are reflected from the partial reflector 212 and the other portion of the optical power pass through the partial reflector 212 for transmission of the downstream signals.

The lights reflected from the partial reflector 212 pass through the optical multiplexer 114 again, and some portion of the power of the reflected lights travel into the power monitors 210 via optical couplers 117, respectively.

Each of the power monitors 210 maximizes the power level of the received light by controlling a thermoelectric cooler 112 connected to the corresponding optical source 111. In particular, since the lights reflected from the partial reflector 212 pass through the optical multiplexer 114 twice, the lights are significantly affected by a change in a passband of the optical multiplexer 114, and thus can be efficiently used for wavelength tracking.

Similarly, in order to equalize wavelengths of the optical multiplexer 131 of the remote node 130 with those of the optical sources 151, lights emitted from the optical sources 151 pass through the optical multiplexer 131 via an optical fiber 140, and some portion of the optical power of the passing lights are reflected from the partial reflector 230 and the other portion of the power pass through the partial reflector 230 for transmission of upstream signals.

The reflected lights pass through the optical multiplexer 131 and the optical fiber 140 again and travel into the power monitors 250 via optical couplers 155, respectively. Then, each of the power monitors 250 controls the thermoelectric cooler 152 connected to the corresponding optical source 151 to maximize the power level of the received light.

Lastly, in order to equalize the wavelengths of the optical multiplexer/demultiplexer 114 of the central base station 110 with those of the optical multiplexer/demultiplexer 131 of the remote node 130, upstream signals supplied to the central base station 110 are used. Specifically, the upstream signals from the subscriber terminals 150 sequentially pass through the remote node 130, the optical fiber 120, and the demultiplexer 114, and are finally the optical receivers 113 via the optical demultiplexer 114. Some of the upstream signals are supplied to the power monitor 211 via an optical coupler 118 before the optical receiver 113. The power monitor 211 controls a thermoelectric cooler 115-1 of the demultiplexer 114 to maximize the power level of the received light.

Figure 5:
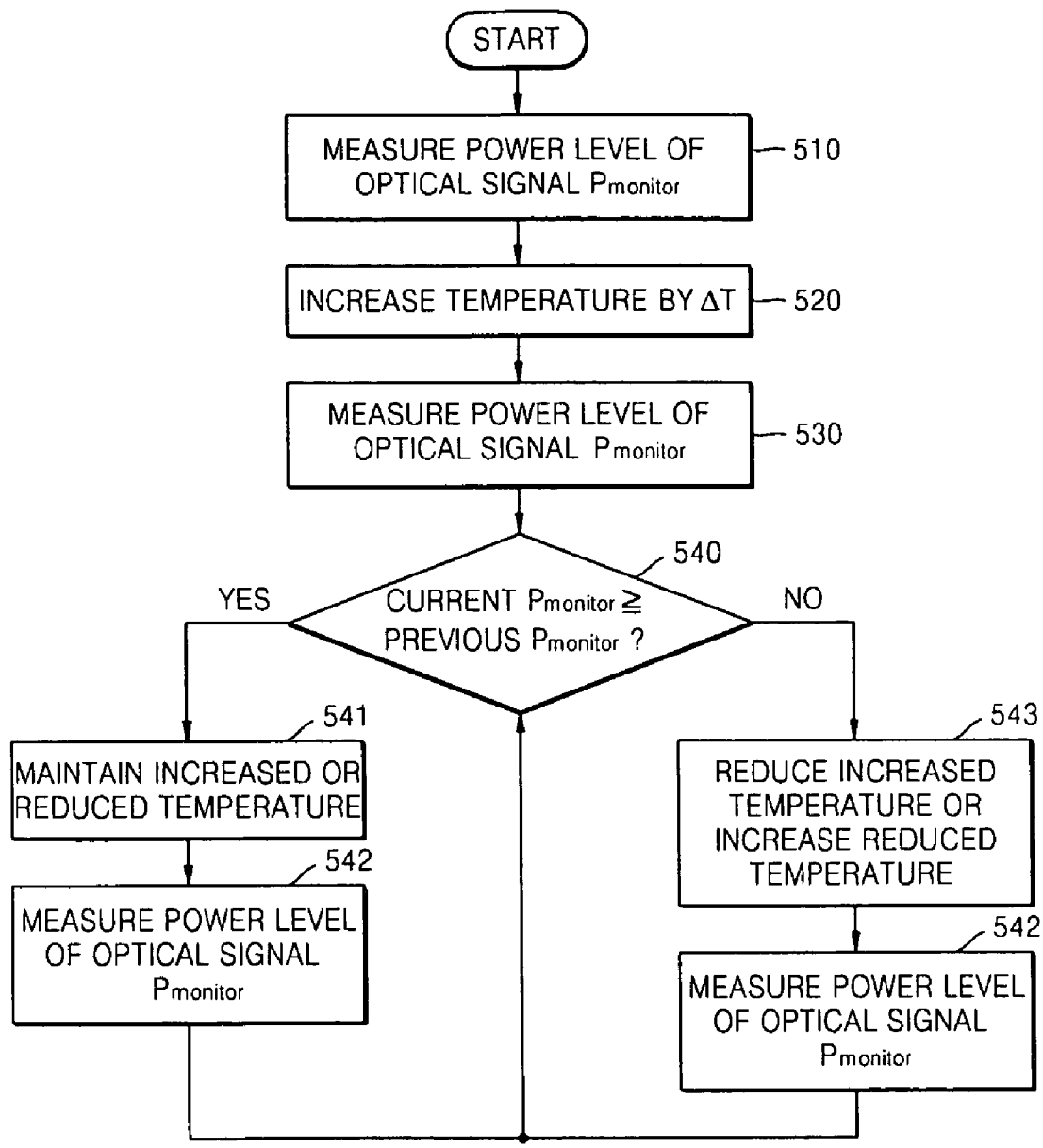
FIG. 5 is a flowchart illustrating operations of controlling the temperatures of thermoelectric coolers and power monitors of the wavelength tracking apparatus shown in FIG. 4, according to an embodiment of the present invention.

FIG. 5 is a flowchart illustrating operations of controlling the power monitors 210, 211, and 250 and the temperatures of the thermoelectric coolers 112, 115, and 152 of the wavelength tracking apparatus shown in FIG. 4, according to an embodiment of the present invention. Referring to FIG. 5, the power level of an optical signal $P_0$ is measured (510), and the changed optical power level of an optical signal $P_1$ is measured (530) after increasing or reducing the temperature by $\Delta T$ (520).

Next, it is determined whether the power level of the optical signal $P_1$ is equal to or greater than that of the optical signal $P_0$, i.e., $P_1 \geq P_0$ (540). If $P_1 \geq P_0$, the changed temperature is maintained (541), and then, the level of an optical signal $P_2$ is measured (542).

Similarly, it is determined whether $P_2 \geq P_1$. If $P_2 \geq P_1$, the changed temperature is maintained.

However, if $P_1 < P_0$, the increased temperature is reduced or the reduced temperature is increased (543). In this way, it is possible to control the thermoelectric coolers 112, 115, and 152 so that the level of an optical signal can be maximized.

Figure 6A:
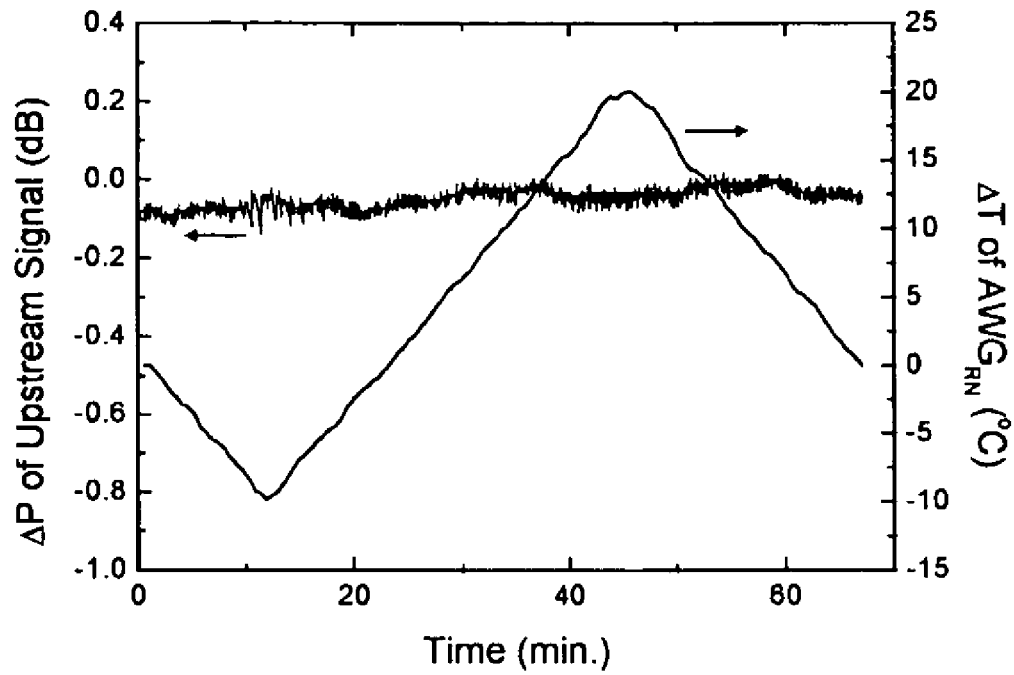
FIG. 6 illustrates graphs respectively showing variations in the optical power level and wavelength of an optical upstream signal received at a central base station when the temperature of a remote node changes, in the wavelength tracking apparatus illustrated in FIG. 2, according to an embodiment of the present invention.
Figure 6B:
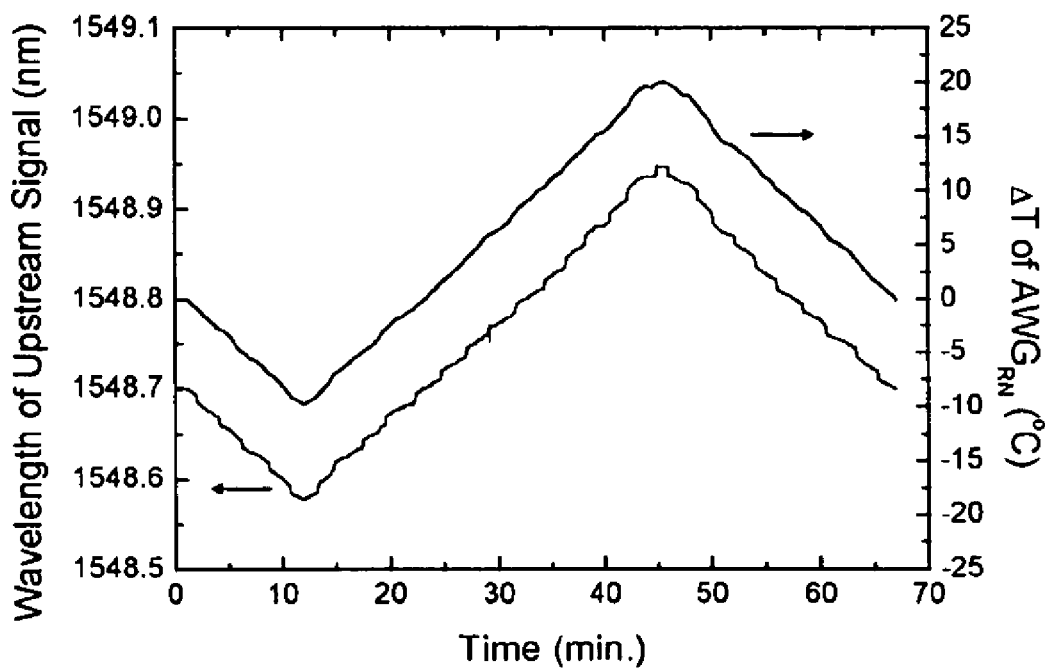

FIG. 6 illustrates graphs respectively showing variations in the optical power level and wavelength of an optical upstream signal received from the central base station 110 when the temperature of the remote node 130 changes, in the wavelength tracking apparatus illustrated in FIG. 2, according to an embodiment of the present invention. The graph (a) of FIG. 6 shows a variation in the optical power level of the optical upstream signal received at the central base station 110 as the temperature of the remote node 130 changes. The graph (b) of FIG. 6 shows a variation in the wavelength of the optical upstream signal received at the central base station 110 as the temperature of the remote node 130 changes.

To measure the performance of the wavelength tracking apparatus, the temperature of the remote node 130 was periodically changed by about 30° C. at a rate of 0.88° C./min. As a result, a variation in the optical power level of the optical upstream signal received was just 0.25 dB or less when the temperature of the remote node 130 was changed by 30° C. The result shows that the optical upstream signal tracks down a variation in the wavelength of a passband of the optical multiplexer 132 of the remote node 130.

Figure 7A:
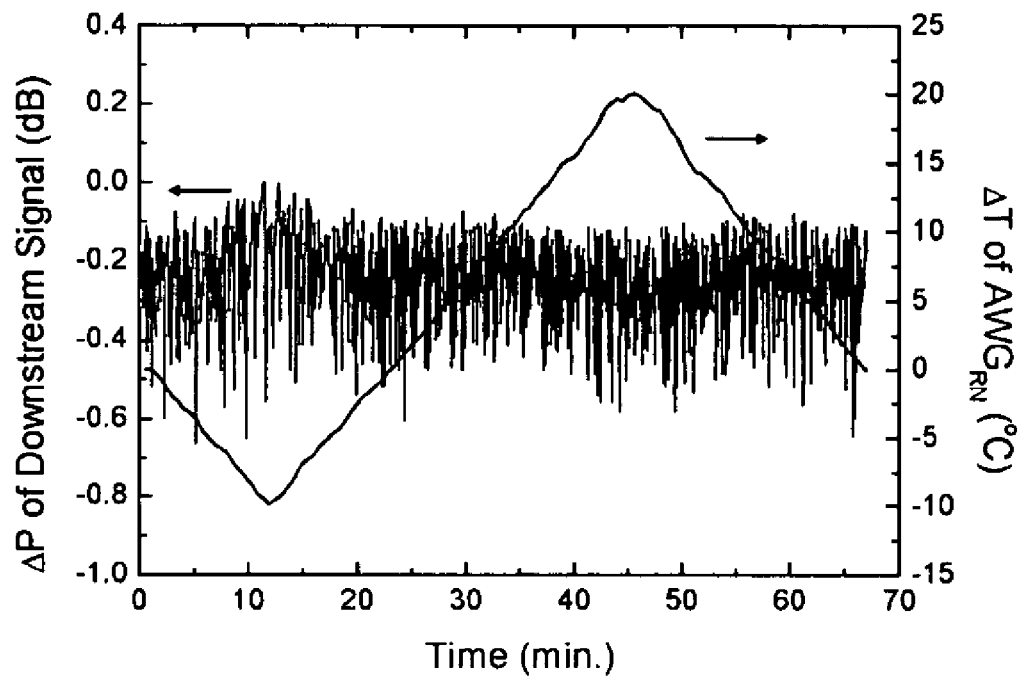
FIG. 7 illustrates graphs respectively showing variations in the optical power level and wavelength of an optical downstream signal received at a subscriber terminal when the temperature of a remote node changes, in the wavelength tracking apparatus of FIG. 2, according to an embodiment of the present invention.
Figure 7B:
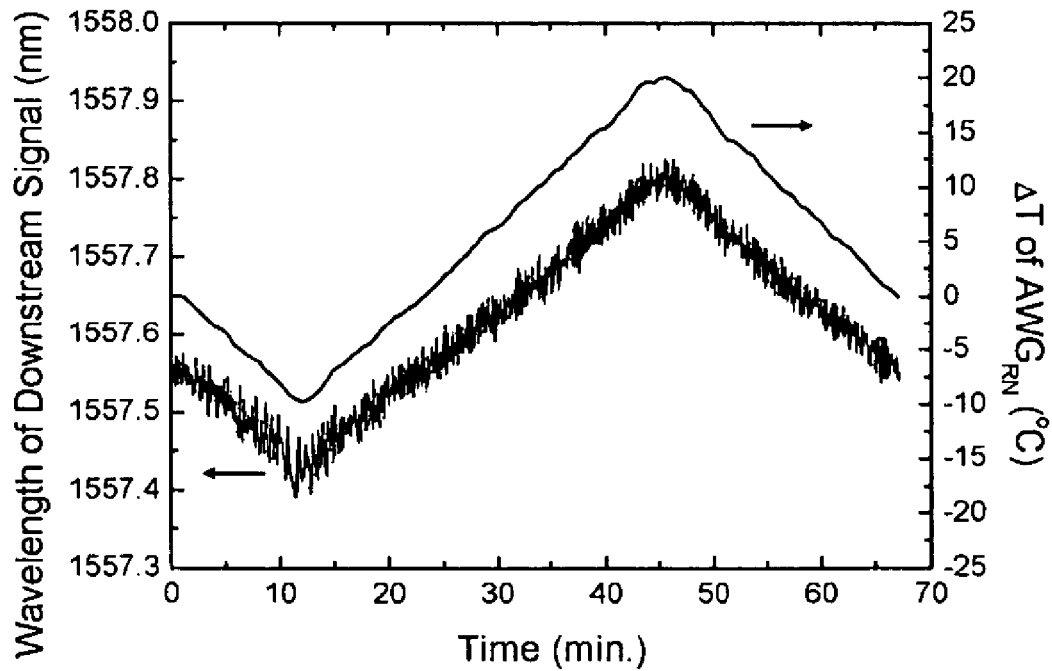

FIG. 7 illustrates graphs respectively showing variations in the optical power level and wavelength of an optical downstream signal received from one of the subscriber terminals 150 when the temperature of the remote node 130 changes, in the wavelength tracking apparatus of FIG. 2, according to an embodiment of the present invention. The graph (a) of FIG. 6 shows a variation in the optical power level of the optical downstream signal received at the subscriber terminal 150 as the temperature of the remote node 130 changes. The graph (b) of FIG. 6 shows a variation in the wavelength of the optical downstream signal received at the subscriber terminal 0 as the temperature of the remote node 130 changes.

To measure the performance of a wavelength tracking method according to an embodiment of the present invention, the temperature of the remote node 130 was periodically changed by about 30° C. at a rate of 0.88° C./min. As a result, a variation in the optical power level of the optical downstream signal received was just 0.7 dB or less when the temperature of the remote node 130 was changed by 30° C. The graph shows that the optical downstream signal tracks down a variation in the wavelength of a passband of the optical multiplexer 131 of the remote node 130.

Figure 8:
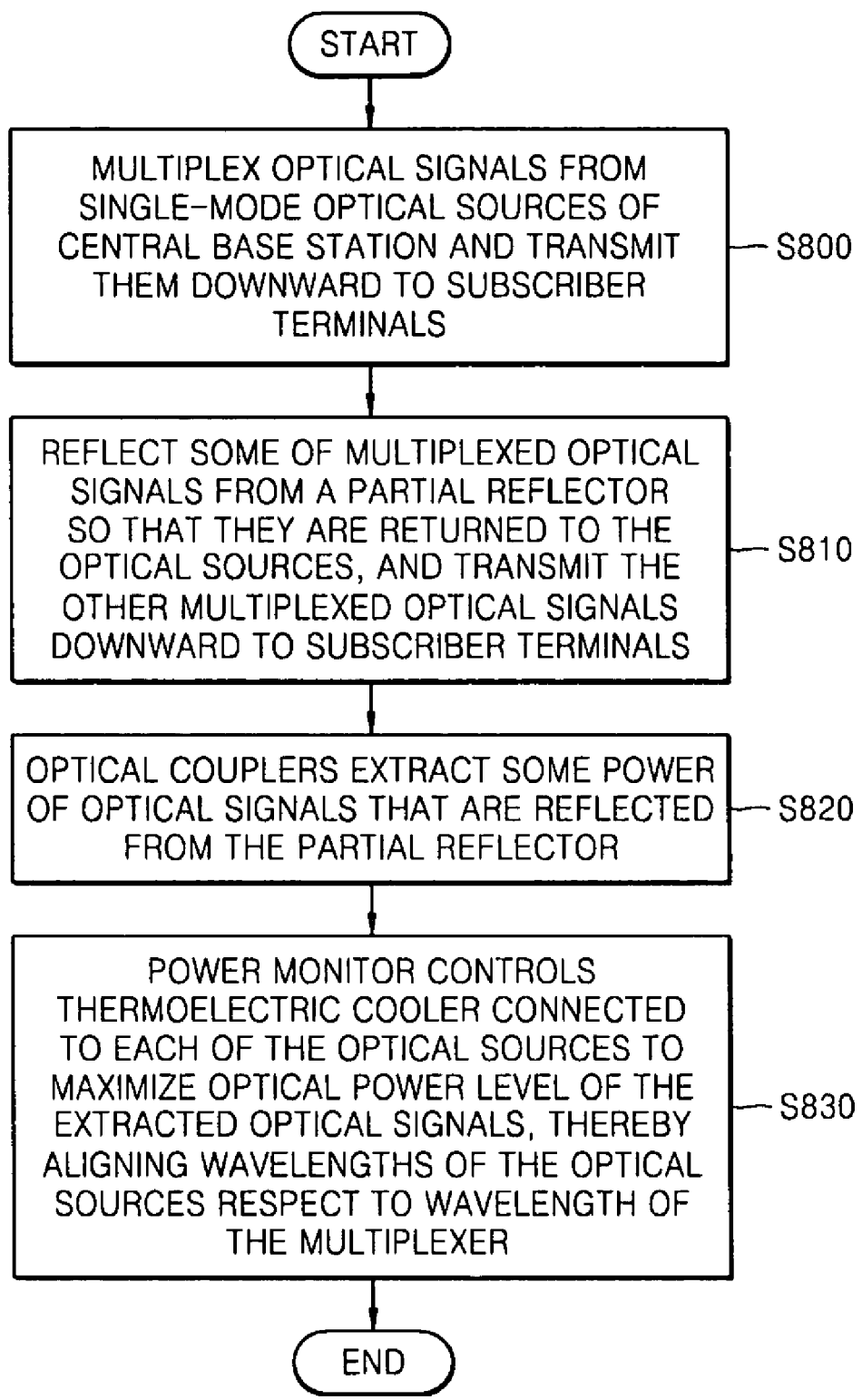
FIG. 8 is a flowchart illustrating a method of aligning a wavelength of an optical source of a central base station with respect to that of a multiplexer/demultiplexer of a central base station according to an embodiment of the present invention.

FIG. 8 is a flowchart illustrating a method of aligning a wavelength of to those of a plurality of single-mode optical sources of a central base station with respect to that of a multiplexer of a central base station according to an embodiment of the present invention. Referring to FIG. 8, optical signals from the single-mode optical sources of the central base station are multiplexed by the multiplexer/demultiplexer of the central base station and transmitted downward to the subscriber terminals (S800).

Next, some portion of the optical power of the multiplexed optical signals are reflected from a partial reflector and returned to the optical sources, and the other portion of the multiplexed optical signals are transmitted downward to the subscriber terminals (S810).

Some portion of the optical power of the optical signals that are reflected from the partial reflector, pass through the multiplexer, and then are returned are extracted by optical couplers (S820).

Next, a power monitor controls a thermoelectric cooler connected to each of the optical sources to maximize the optical power level of the optical signals extracted by the optical coupler, thereby aligning the wavelengths of the single-mode optical sources of the central base station with respect to the wavelengths of the multiplexer/demultiplexer (S830).

Figure 9:
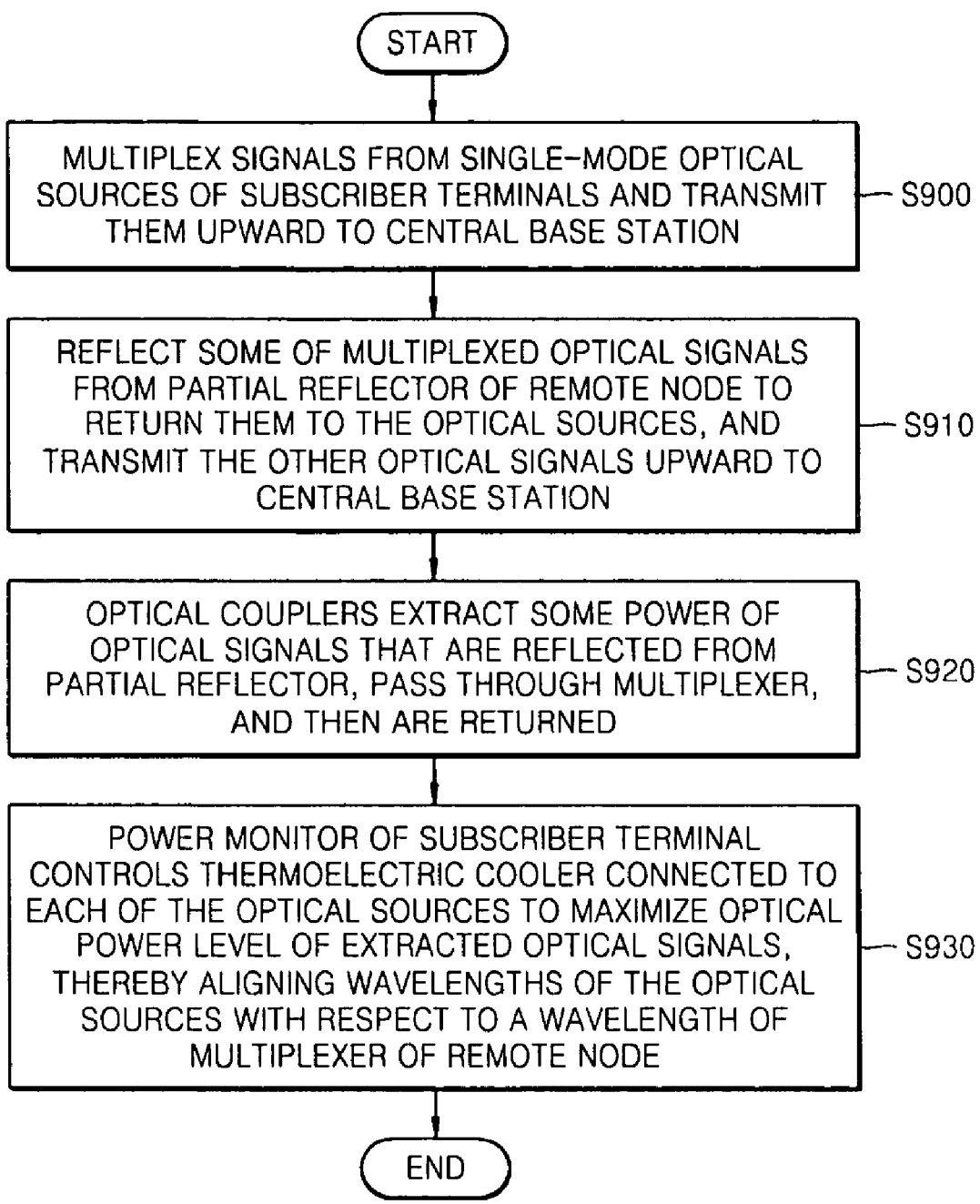
FIG. 9 is a flowchart illustrating a method of aligning a wavelength of a passband of a multiplexer/demultiplexer of a remote node with respect to that of an optical source of a subscriber terminal according to an embodiment of the present invention.

FIG. 9 is a flowchart illustrating a method of aligning wavelengths of passbands of a multiplexer/demultiplexer of a remote node with respect to those of a plurality of single-mode optical sources of subscriber terminals according to an embodiment of the present invention. Referring to FIG. 9, signals from the single-mode optical sources of the subscriber terminals are multiplexed by the multiplexer of the remote node and then transmitted upward to the central base station (S900).

Next, some portion of the optical power of the multiplexed optical signals are reflected from a partial reflector and returned to the optical sources of the subscriber terminals, and the other portion of the optical signals are transmitted upward to the central base station (S910).

Next, some portion of the optical power of the optical signals that are reflected from the partial reflector, pass through the multiplexer, and then are returned are extracted by optical couplers (S920).

Then, a power monitor controls a thermoelectric cooler connected to each of the optical sources so that the optical power level of the optical signals extracted by the optical coupler can be maximized, thereby aligning the wavelengths of the single-mode optical sources of the subscriber terminal with respect to those of the multiplexer of the remote node (S930).

Figure 10:
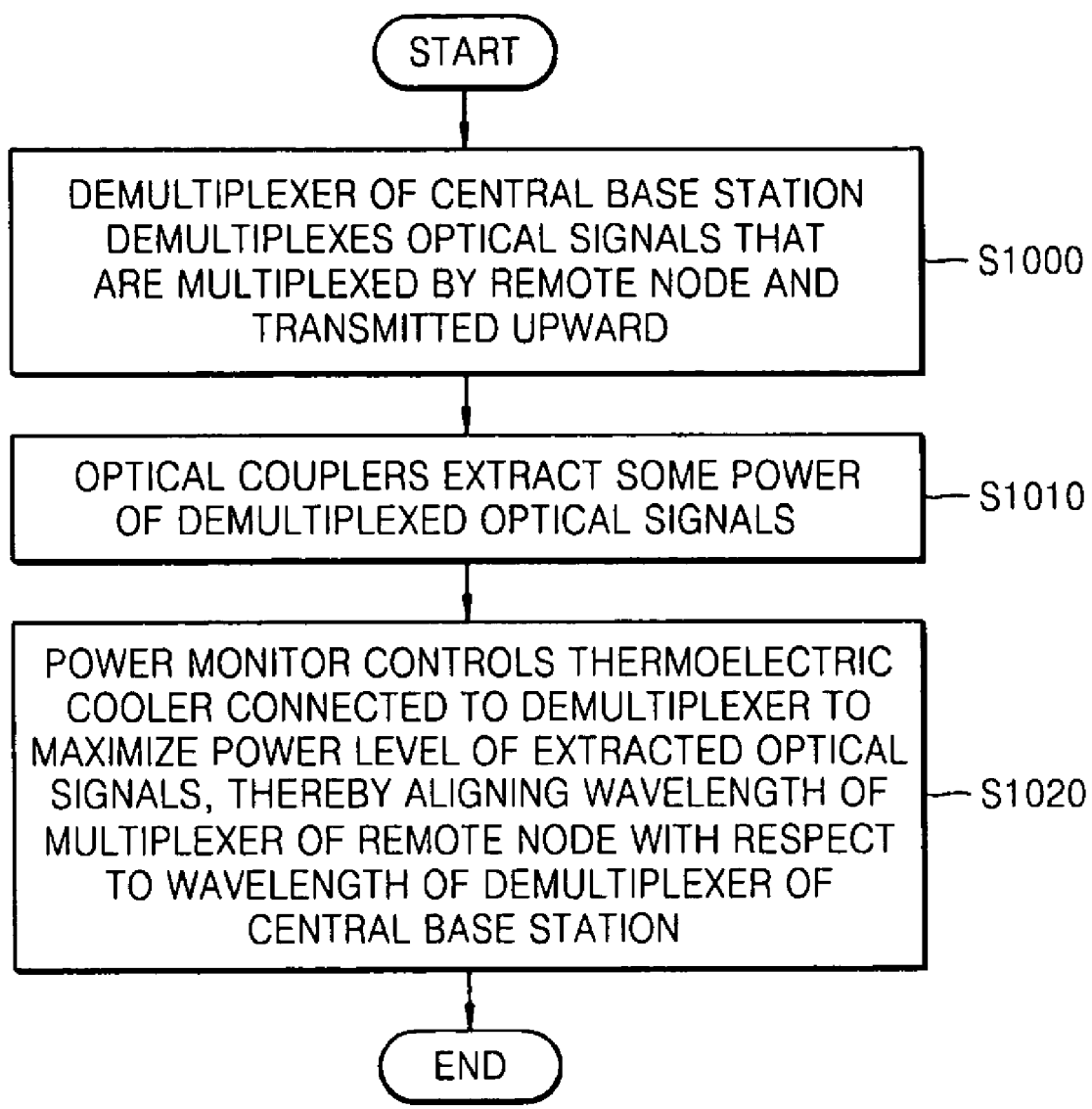
FIG. 10 is a flowchart illustrating a method of aligning a wavelength of a passband of a demultiplexer of a central base station with respect to that of a passband of a multiplexer of a remote node according to an embodiment of the present invention.

FIG. 10 is a flowchart illustrating a method of aligning a wavelength of passbands of a demultiplexer of a central base station with respect to that of passbands of a multiplexer of a remote node according to an embodiment of the present invention. First, optical signals that are multiplexed by the multiplexer of the remote node and transmitted upward are demultiplexed by the demultiplexer of the central base station (S1000).

Next, some portion of the optical power of the demultiplexed optical signals are extracted by optical couplers (S1010).

Next, a power monitor controls a thermoelectric cooler connected to the demultiplexer to maximize the optical power level of the optical signals extracted by the optical coupler, thereby aligning the wavelength of the multiplexer of the remote node with respect to that of the demultiplexer of the central base station (S1030).

As described above, the present invention provides an apparatus and method for efficiently tracking a wavelength in a general WDM-PON system that uses a single-mode optical source. According to the present invention, even if the temperature of a remote node changes, the optical power levels of an optical upstream signal received at a central base station and an optical downstream signal received at a subscriber terminal can be maintained at 1 dB or less. Even if power is not supplied to a remote node, the optical downstream signal can be stably transmitted to the subscriber terminal and the optical upstream signal can be stably transmitted to the central base station, thereby increasing the reliability of the WDM-PON system.

Also, it is possible to minimize optical loss in a channel caused by a change in the temperature of a remote node and the performance degradation of the system due to crosstalk among the optical channels.

In a wavelength tracking apparatus according to the present invention, a signal reflected from a partial reflector passes through a multiplexer/demultiplexer twice to be adjusted according to a change in the wavelength of a passband of the multiplexer/demultiplexer, and thus can be effectively utilized for wavelength tracking.

The wavelength tracking apparatus according to the present invention also equalizes a wavelength of an optical source of a central base station with that of an optical multiplexer of the central base station, a wavelength of an optical multiplexer of a remote node with that of a subscriber optical source, and a wavelength of an optical multiplexer/demultiplexer of the central base station with that of an optical multiplexer/demultiplexer of the remote node, thereby monitoring a cut occurrence of the optical fiber and increasing the reliability of the network.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An apparatus for tracking a wavelength in a passive optical subscriber network in which a central base station and at least one subscriber terminal are connected via a remote node, the apparatus comprising:
   a first wavelength aligning unit multiplexing and aligning wavelengths of optical signals from a plurality of single-mode optical sources of the central base station;
   a second wavelength aligning unit multiplexing and aligning wavelengths of optical signals transmitted to the remote node from a plurality of single-mode optical sources of the subscriber terminal; and
   a third wavelength aligning unit being included in the central base station, and demultiplexing and aligning wavelengths of optical signals from the second wavelength aligning unit,
   wherein the first wavelength aligning unit comprises:
   a partial reflector reflecting the multiplexed optical signals being transmitted downward to the subscriber terminal so that some portion of the optical power of the optical signals are returned to the single-mode optical sources of the central base station;
   a plurality of optical couplers respectively extracting the some portion of optical power of the optical signals returned from the partial reflector;
   a plurality of power monitors, each measuring an optical power level of one of the optical signals extracted by one of the optical couplers; and
   a plurality of thermoelectric coolers respectively increasing or decreasing temperatures of the single-mode optical sources of the central base station so that the optical power levels of the optical signals measured by the power monitors are increased.

2. An apparatus for tracking a wavelength in a passive optical subscriber network in which a central base station and at least one subscriber terminal are connected via a remote node, the apparatus comprising:
   a first wavelength aligning unit multiplexing and aligning wavelengths of optical signals from a plurality of single-mode optical sources of the central base station;
   a second wavelength aligning unit multiplexing and aligning wavelengths of optical signals transmitted to the remote node from a plurality of single-mode optical sources of the subscriber terminal; and
   a third wavelength aligning unit being included in the central base station, and demultiplexing and aligning wavelengths of optical signals from the second wavelength aligning unit, wherein the second wavelength aligning unit comprises:

a partial reflector being located in the remote node, the partial reflector reflecting the multiplexed optical signals being transmitted upward to the central base station so that some portion of the optical power of the multiplexed optical signals are returned to the single-mode optical sources of the subscriber terminal;

a plurality of optical couplers respectively extracting the some portion of optical power of the optical signals returned from the partial reflector;

a plurality of power monitors, each measuring an optical power level of one of the optical signals extracted by one of the optical couplers; and a plurality of thermoelectric coolers respectively increasing or decreasing temperature of the single-mode optical sources of the central base station so that the optical power levels of the optical signals measured by the power monitors are increased.

3. A method of tracking a wavelength in a passive optical subscriber network in which a central base station and at least one subscriber terminal are connected via a remote node, the method comprising:

a first wavelength aligning operation in which wavelengths of optical signals from a plurality of single-mode optical sources of the central base station are multiplexed and aligned;

a second wavelength aligning operation in which the remote node multiplexes and aligns wavelengths of optical signals from a plurality of single-mode optical sources of the subscriber terminal; and a third wavelength aligning operation In which the central base station demultiplexes and aligns the optical signals being demultiplexed and aligned in the second wavelength aligning operation, wherein the first wavelength aligning operation comprises:

reflecting the multiplexed optical signals being transmitted downward to the subscriber terminal so that some portion of the optical power of the multiplexed optical signals are returned to the single-mode optical sources of the central base station;

extracting some portion of the optical power of the optical signals that are reflected and returned; and increasing or decreasing temperature of each of the single-mode optical sources by a thermoelectric cooler so that optical power levels of the extracted optical signals are increased.

4. A method of tracking a wavelength in a passive optical subscriber network in which a central base station and at least one subscriber terminal are connected via a remote node, the method comprising:

a first wavelength aligning operation in which wavelengths of optical signals from a plurality of single-mode optical sources of the central base station are multiplexed and aligned;

a second wavelength aligning operation in which the remote node multiplexes and aligns wavelengths of optical signals from a plurality of single-mode optical sources of the subscriber terminal; and a third wavelength aligning operation in which the central base station demultiplexes and aligns the optical signals being demultiplexed and aligned in the second wavelength aligning operation, wherein the second wavelength aligning operation comprises:

reflecting the multiplexed optical signals being transmitted upward to the central base station so that some portion of the optical power of the multiplexed optical signals are returned to the single-mode optical source of the subscriber terminal;

extracting some portion of the optical power of the returned optical signals; and increasing or decreasing temperature of each of the single-mode optical sources by a thermoelectric cooler so that optical power levels of the extracted optical signals are increased.

* * * * *